United States Patent
Lee

(10) Patent No.: US 6,359,793 B2
(45) Date of Patent: Mar. 19, 2002

(54) HIGH EFFICIENCY CONVERTER FOR ZERO VOLTAGE SWITCHING

(75) Inventor: Sang Yun Lee, Suwon (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/731,407

(22) Filed: Dec. 6, 2000

(30) Foreign Application Priority Data

Apr. 25, 2000  (KR) .......................................... 2000-21965

(51) Int. Cl.$^7$ .............................................. H02M 3/335
(52) U.S. Cl. ........................................... 363/16; 363/17
(58) Field of Search .............................. 363/16, 17, 21, 363/97, 20, 132

(56) References Cited

U.S. PATENT DOCUMENTS 5,448,467 A  *  9/1995  Ferreira ........................ 363/17

* cited by examiner

Primary Examiner—Rajnikant B. Patel
(74) Attorney, Agent, or Firm—Darby & Darby

(57) ABSTRACT

A high efficiency converter for ZVS{zero voltage switching} is disclosed above which can reduce drain-source voltage of switch (MOSFET), heighten adapter efficiency and eliminate need of input voltage doubler circuit by means of making the converter to act in ZVS for wide range of whole input voltage where the converter is particularly featured by comprising high side switch (SWH) and low side switch (SWL) making a closed circuit with input voltage and each making a switching action that is opposite to each other according to output signal of external driver, first capacitor connected in series between the above SWH and SWL, a transformer that induces primary side voltage to secondary side according to switching action of the above SWH and SHL, and a rectifier that rectifies output voltage of secondary side of the above transformer while moreover the converter comprises a diode connected to the above first capacitor in parallel, first and second feedback diodes respectively connected to the above SWH and SWL in parallel, and second capacitor connected to primary coil of the above transformer in series.

2 Claims, 10 Drawing Sheets

HIGH EFFICIENCY CONVERTER FOR ZERO VOLTAGE SWITCHING

BACKGROUND OF THE INVENTION

1. Field of the Invention

This invention relates a high efficiency converter for ZVS{zero voltage switching}, particularly that having both advantages of traditional active clamp flyback circuit and asymmetric flyback circuit so as to act in ZVS for whole wide range of input voltage.

2. Description of the Prior Art

Recently we are under state of continual inevitable request of system specification augmentation such as multimedia system construction, acceleration of CPU to high speed, memory increase according to worldwide trend that notebook PC becomes day by day smaller, lighter, slimmer and pursuing high functionalization.

And as capacity for each resource of each system specification is increasing, though now AC adapter for notebook PC uses 45~50 watts, gradually need is rising up for making high capacity of 60 W, 75 W, 80 W or more, for making it a micro slip easy and simple of carrying and handling, and for high efficiency.

Particularly the reason to make AC adapter in high efficiency is that higher efficiency means lower internal electricity loss, which means lower internal heat generation so that miniaturization be feasible.

Accordingly soft switching is adopted to make AC adapter in high efficiency for the most typical type used in AC adapter so far, whence switch loss should be minimized by means of typically applying ZVS for the above soft switching.

Typical circuit realization methods for the above ZVS are symmetrical flyback circuit and active clamp flyback circuit, among which there occurs setback that input voltage should be doubled up by installing doubler circuit in case of the above asymmetric flyback circuit.

And there occurs disadvantage that drain-source voltage of FET used for switching element in the above active clamp flyback circuit is clamped to substantially high voltage adding the input voltage and the clamp capacitor voltage together.

Problem matter of traditional technique is considered hereunder with reference to appended drawings.

FIG. 1 is circuit diagram that shows active clamp flyback circuit layout in traditional technique, referring to which Figure the circuit is laid out by high side switch SWH and low side switch SWL making a closed circuit with input voltage Vin and each making a switching action that is opposite to each other according to output signal of external driver (not shown in Figure), a capacitor C connected in series between the above SWH and SWL, a transformer T that induces primary side voltage to secondary side according to switching action of the above SWH and SHL, and a rectifier that rectifies output voltage of secondary side of the above Transformer T.

Operation of traditional technique with configuration as above is explained hereunder.

At first comment, leakage energy is used for main switch's ZVS which is realized as current Ic flows through parasitic diode of SWL in section between t1 and t3 and current Is flows through parasitic diode of SWH in section between t4 and t6.

Whence total action is as shown in FIG. 2 where high voltage is clamped by sum of input voltage Vin and capacitor C's voltage Vc for the above SWH and SWL's voltages $V_{DS}^{H}$, $V_{DS}^{L}$.

Typically used asymmetric flyback circuit with active clamp flyback circuit described above is laid out as in appended FIG. 3 where configurational difference from appended FIG. 1 is that capacitor C is placed between SWL and primary side coil of transformer T.

Thus simple difference in configuration makes to show a very large difference in its action state as shown in appended FIG. 4.

Namely in traditional technology as aforesaid while there is advantage in active clamp flyback circuit shown in FIG. 1 that here is no need of doubler necessary in asymmetric flyback circuit shown in appended FIG. 3, in contrast there is a different advantage in the above asymmetric flyback circuit that FET's drain-source voltage used for switching element is stable because it is related only to input voltage differently from case of the above active clamp flyback circuit where the voltage is clamped in a considerably high voltage adding the input voltage and the clamp capacitor voltage together.

Accordingly (dis)advantage is so manifest for either side of the above active clamp flyback circuit and asymmetric flyback circuit that a designer should design taking advantage of only one side of the two cases but it contained problem matter that it has limit in satisfying users' need which is strengthened step by step.

SUMMARY OF THE INVENTION

This invention is devised to solve the above problem matter whose purpose is to provide high efficiency converter for ZVS combining both side advantages of traditional active clamp flyback circuit and asymmetric flyback circuit to reduce drain-source voltage of switch (MOSFET), enhance adapter efficiency, and make the input voltage doubler circuit be not needed by means of making the converter to act in ZVS in wide range of whole input voltage.

According to main feature of this invention to achieve the above purpose, a high efficiency converter for ZVS is provided comprising high side switch (SWH) and low side switch (SWL) making a closed circuit with input voltage and each making a switching action that is opposite to each other according to output signal of external driver, first capacitor connected in series between the above SWH and SWL, a transformer that induces primary side voltage to secondary side according to switching action of the above SWH and SHL, and a rectifier that rectifies output voltage of secondary side of the above transformer while moreover the converter comprises a diode connected to the above first capacitor in parallel, first and second feedback diodes respectively connected to the above SWH and SWL in parallel, and second capacitor connected to primary coil of the above transformer in series.

Whence it is preferable according to additional feature of this invention that the above SWH and SWL are laid out containing MOSFET{metal-oxide semiconductor field-effect transistor}.

DETAILED DESCRIPTION

Various merits and purpose of this invention as described above will be more manifested for persons skilled in this technical field according to preferable practice example of this invention explained hereafter with reference to appended drawings.

Now the preferable practice example of this invention is explained in detail as follows with reference to appended drawings.

Figure 5:
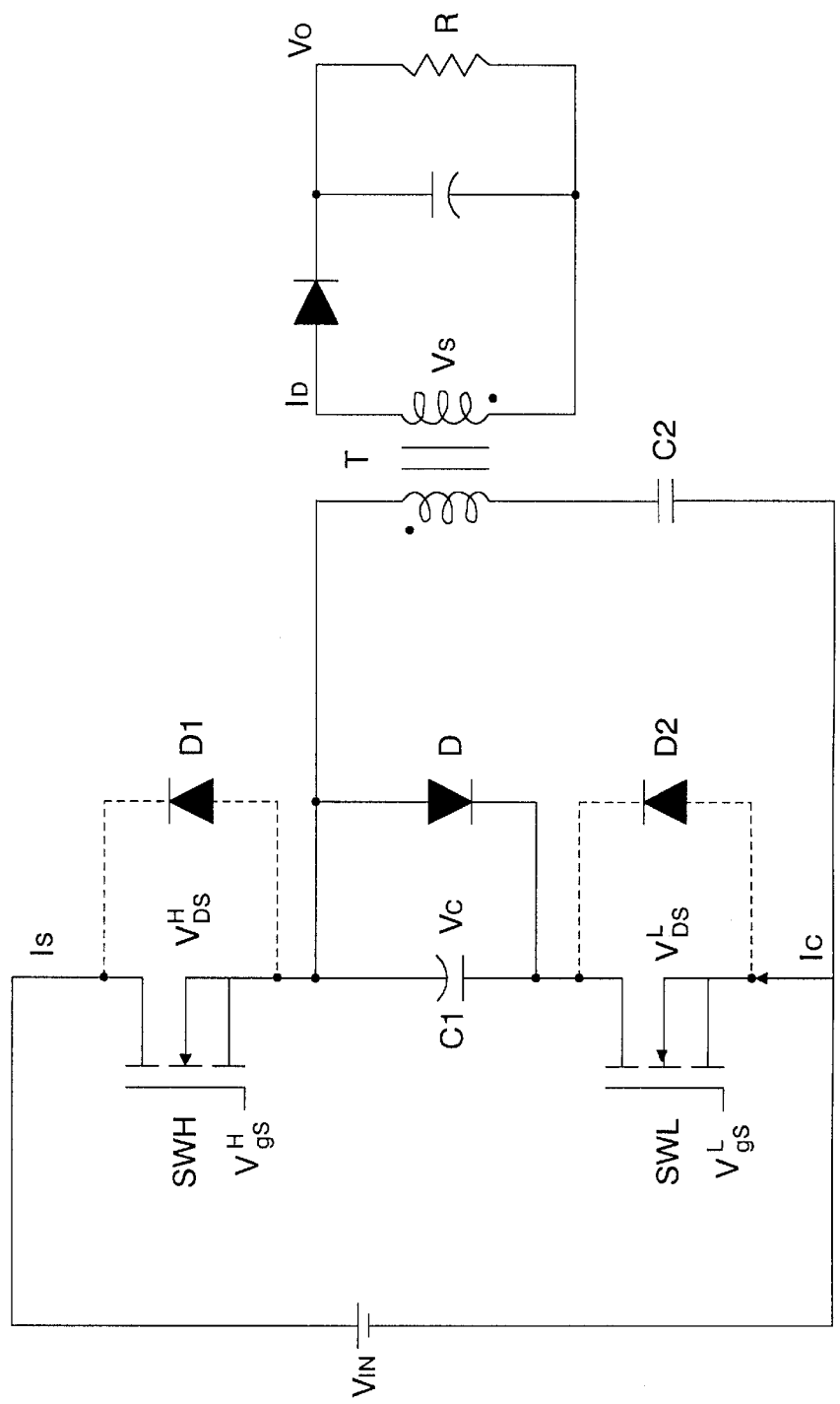
FIG. 5 is circuit diagram that shows converter configuration according to the present invention.
Figure 6:
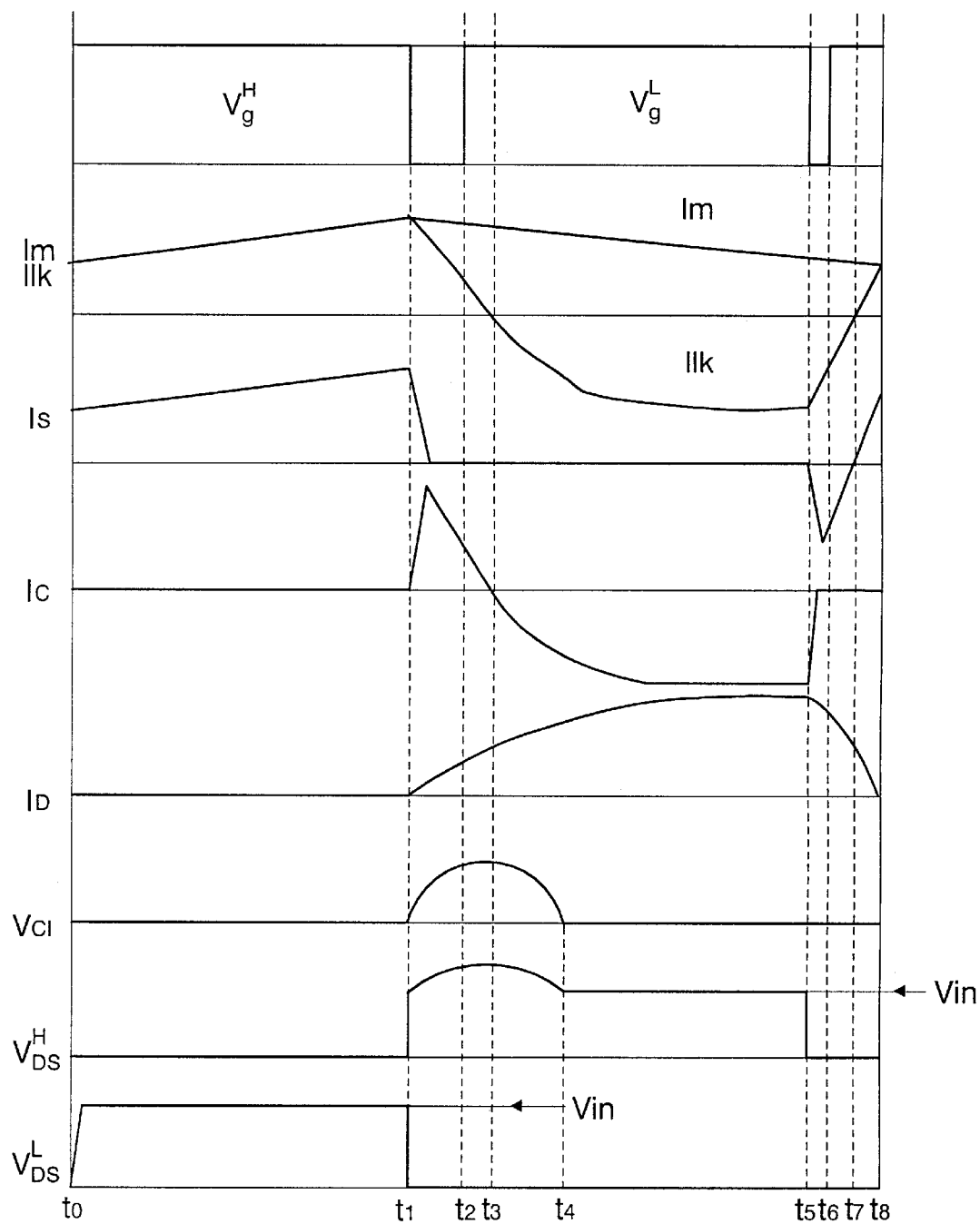
FIG. 6 is wave shape diagram that shows action by FIG. 5.

FIG. 5 is circuit diagram that shows converter configuration according to the present invention and FIG. 6 is wave shape diagram that shows action by FIG. 5.

Figure 1:
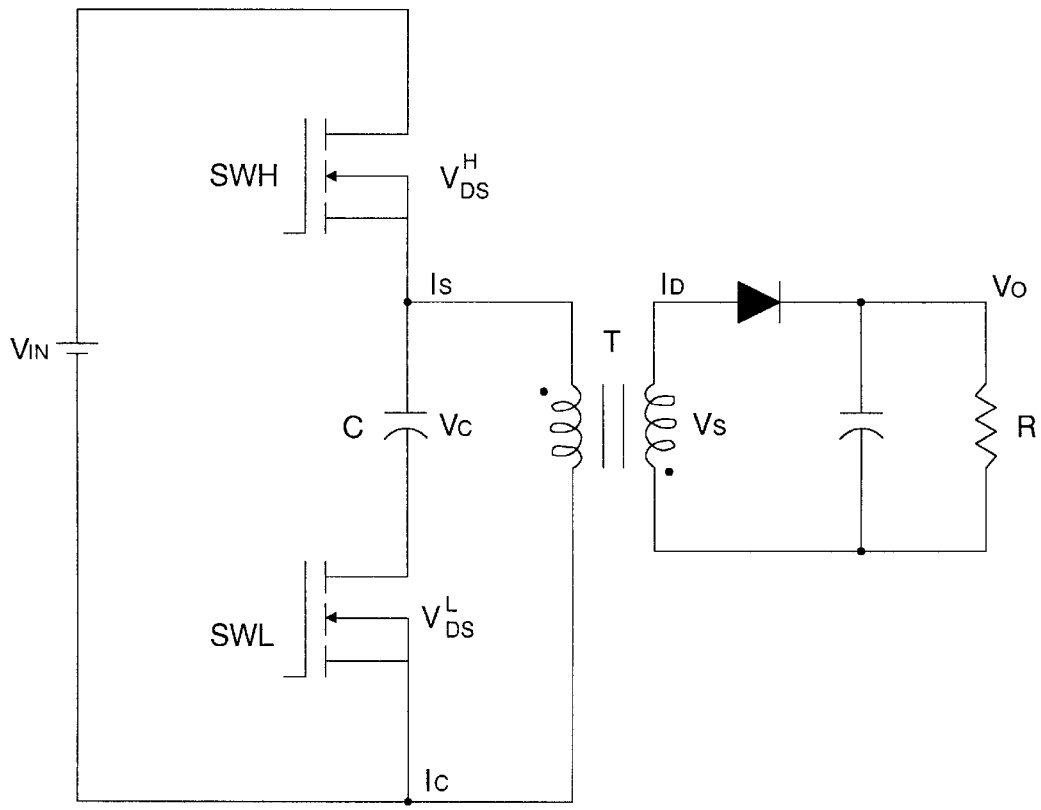
FIG. 1 is circuit diagram that shows converter configuration by active clamp flyback circuit in traditional technique.
Figure 2:
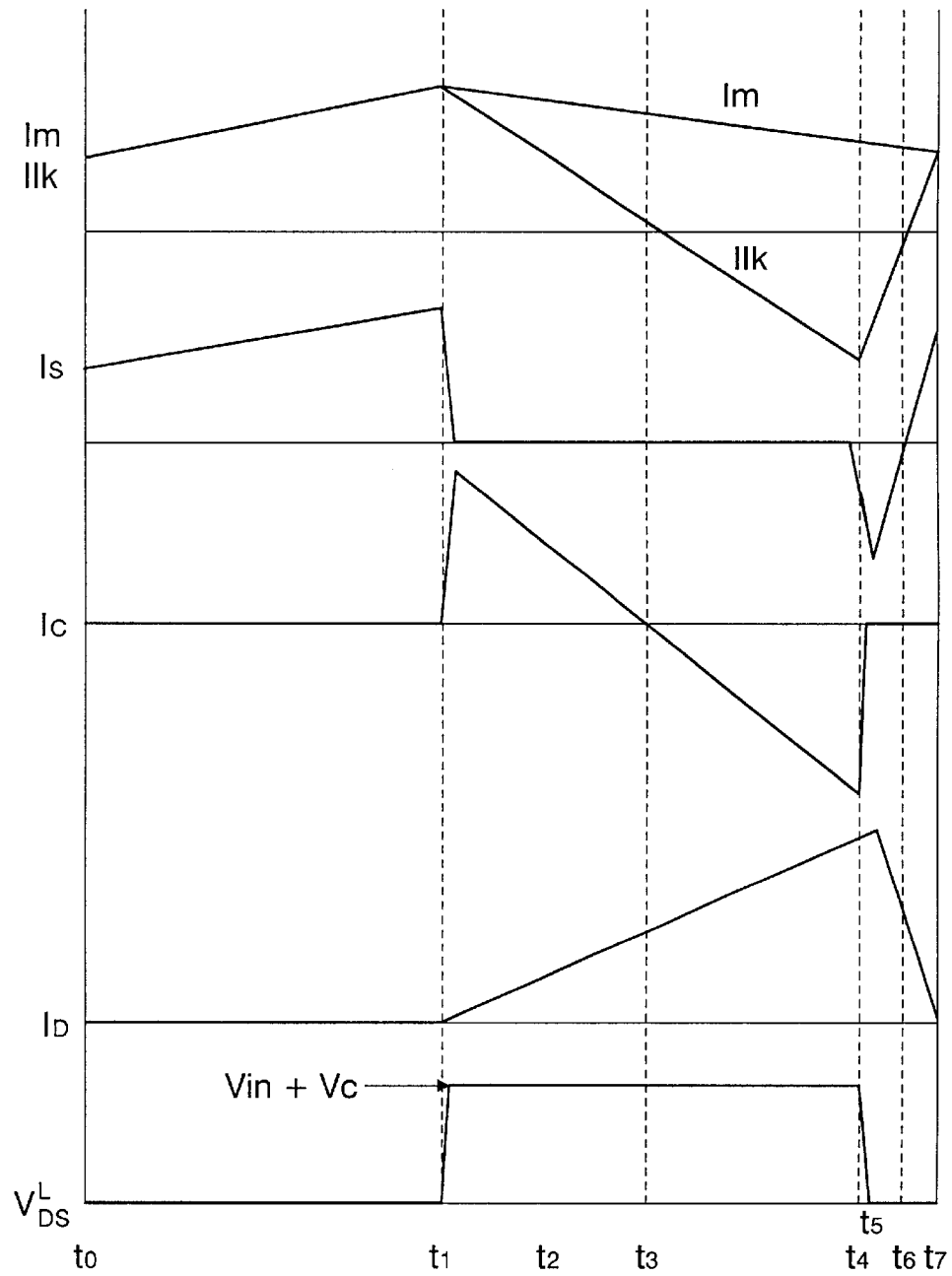
FIG. 2 is wave shape diagram that shows action by FIG. 1.
Figure 3:
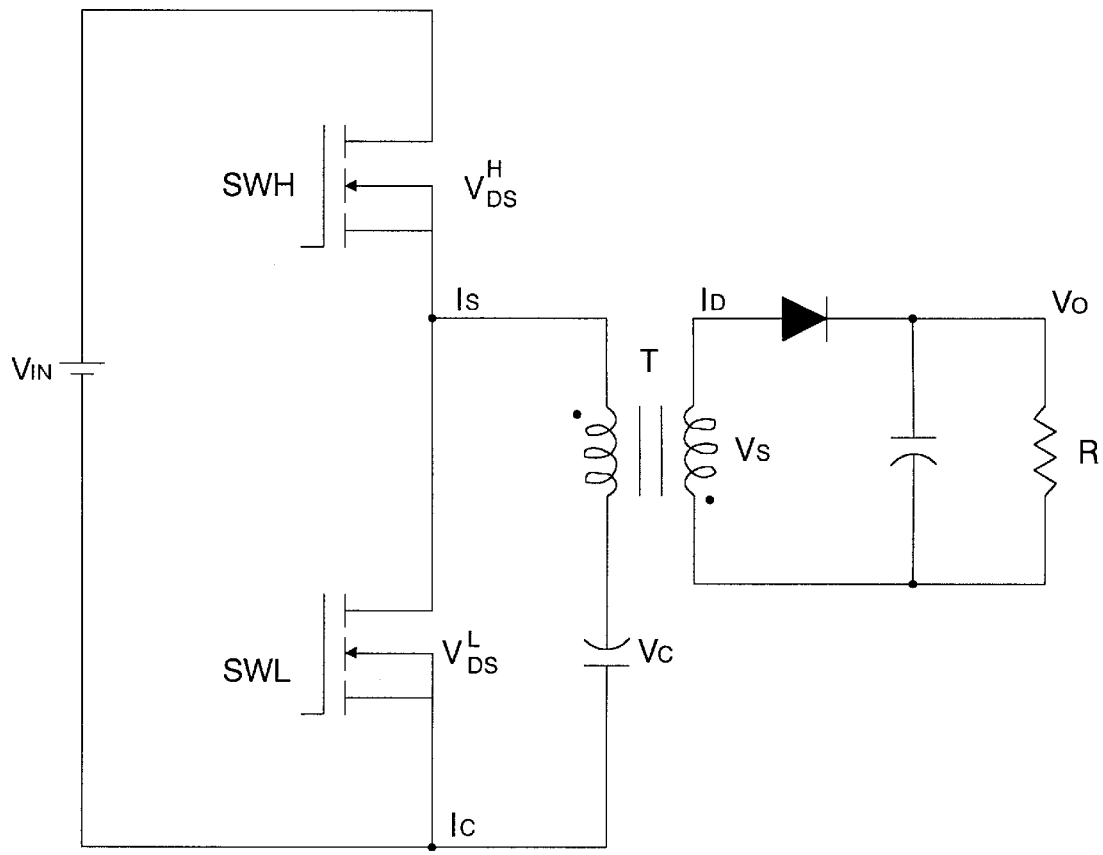
FIG. 3 is circuit diagram that shows converter configuration by asymmetric flyback circuit in traditional technique.
Figure 4:
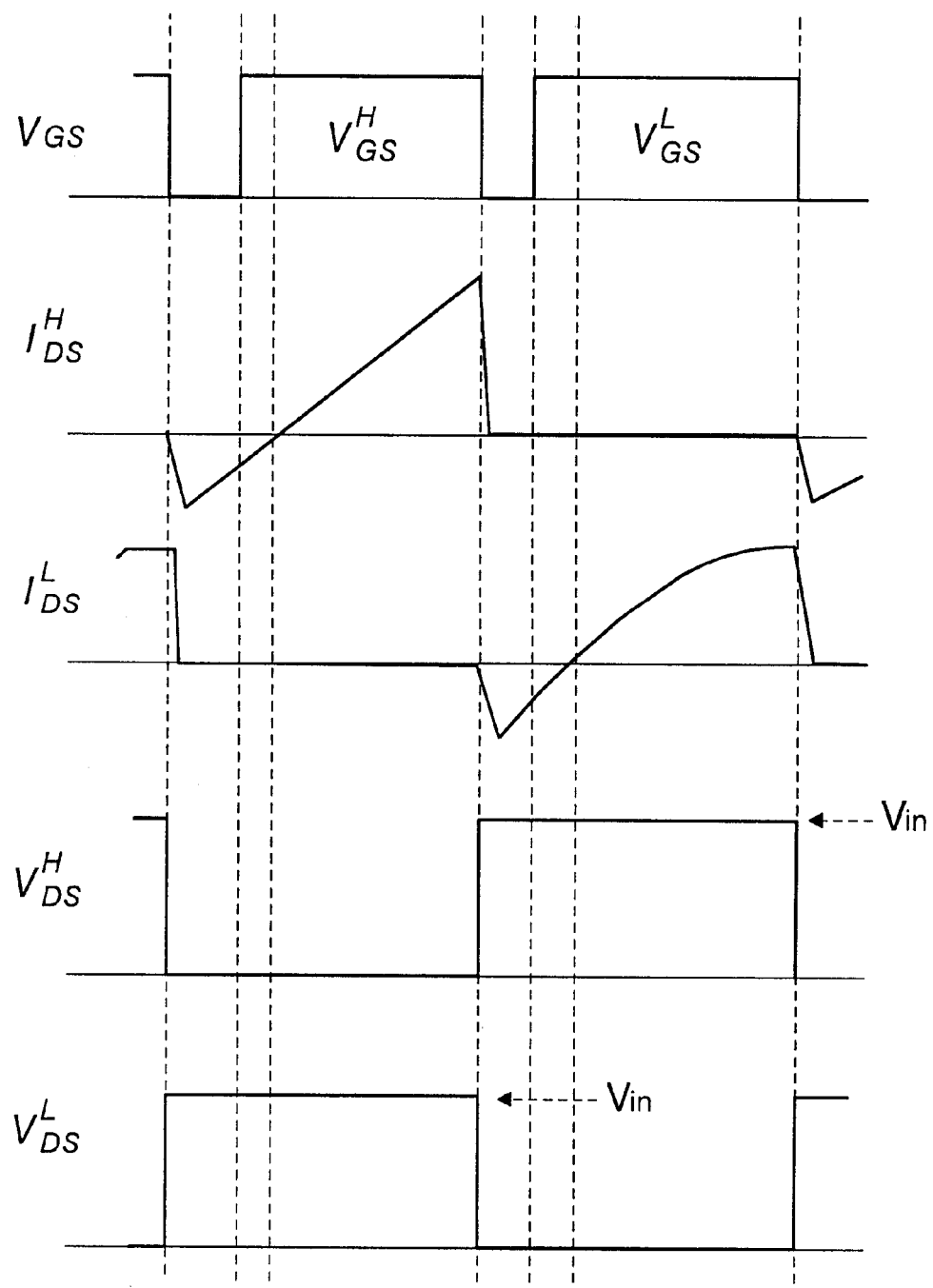
FIG. 4 is wave shape diagram that shows action by FIG. 3.

Referring to FIG. 5, it comprises in same manner as in FIG. 1 high side switch SWH and low side switch SWL making a closed circuit with input voltage Vin and each making a switching action that is opposite to each other according to output signal of external driver (not shown in Figure), first capacitor C1 connected in series between the above SWH and SWL, a diode D connected to the above C1 in parallel, a transformer T that induces primary side voltage to secondary side according to switching action of the above SWH and SHL, second capacitor C2 connected to primary coil of the above transformer T in series, and a rectifier that rectifies output voltage of secondary side of the above transformer T.

Whence first and second feedback diodes D1, D2, connected by dotted or broken lines not explained hereabove but shown in appended FIG. 5 for explanation of the above configuration, that are connected in parallel to the above SWH and SWL if these two switches comprise MOSFET, are internal diodes of the above SWH and SWL so that those do not show actual configuration but are shown here to be laid out in order to facilitate this invention explanation.

Action by present invention with configuration as above is explained as follows.

Figure 7:
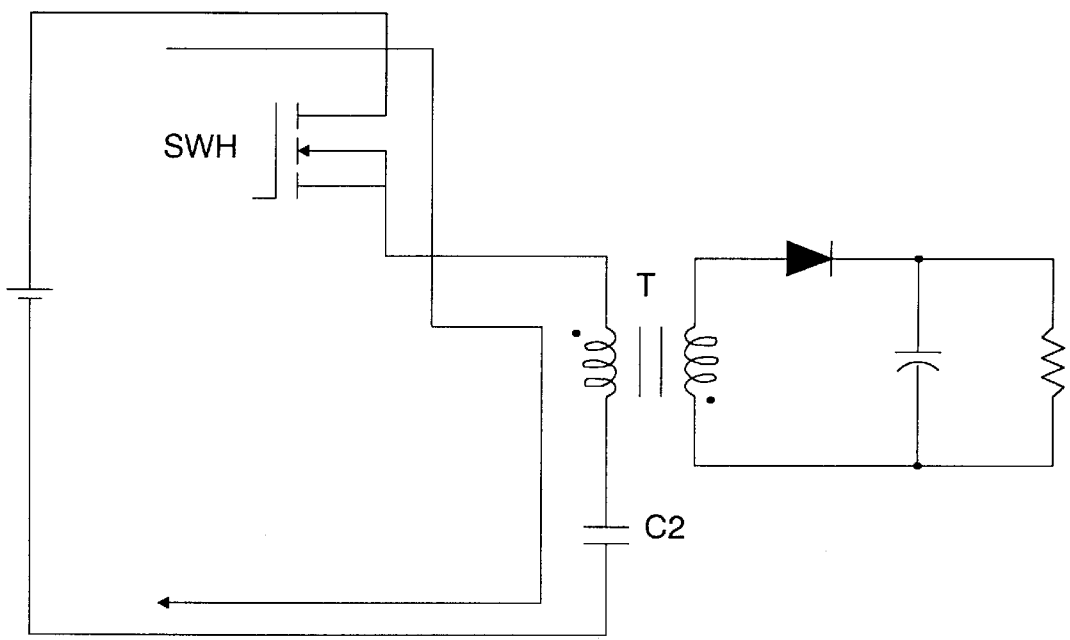
FIG. 7 through FIG. 13 are equivalent circuit diagrams that show actions at respective intervals for present invention.

Though total action of present invention is according to FIG. 5, let us consider action at each interval with reference to equivalent circuit diagrams of appended FIG. 7 through FIG. 13 that show actions at respective intervals for present invention. Referring to FIG. 7, the above SWH is turned on and the above SWL is turned off in interval between t7 and t8 and in interval between t0 and t1. And Ilk becomes positive and reaches Im at t8. Whence Is also becomes positive at t7 while second capacitor C2 performs electricity charging.

Figure 8:
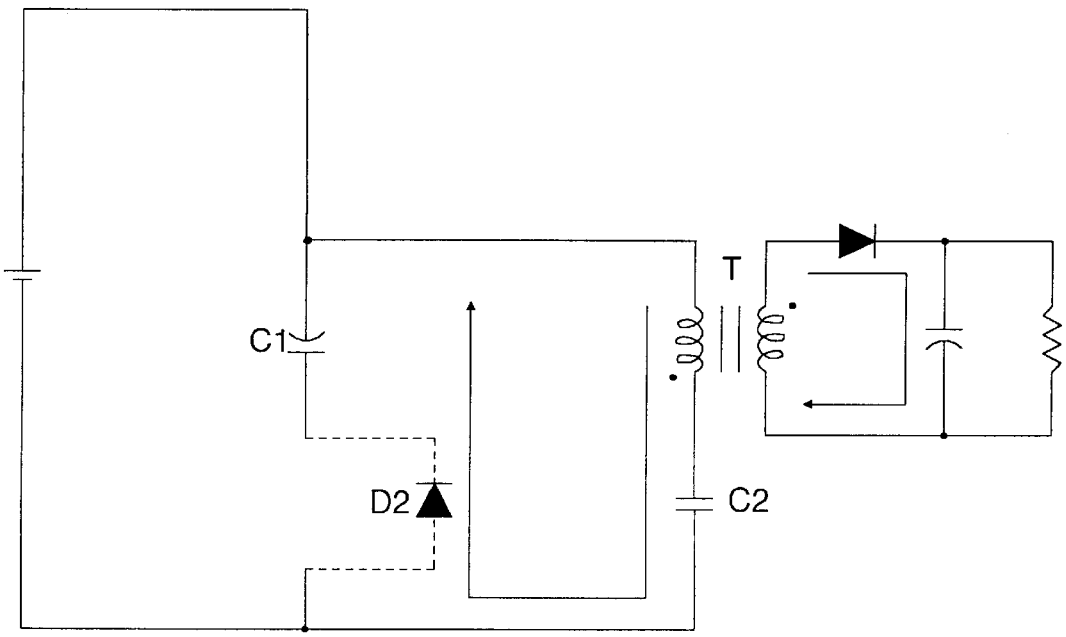

And referring to FIG. 8, SWH is turned off and SWL maintains the off state in interval between t1 and t2. And parasitic diode of the above SWL is turned on while electricity charging of first and second capacitors C1, C2 continues to perform. Whence energy is transmitted to secondary side at the above transformer T.

Figure 9:
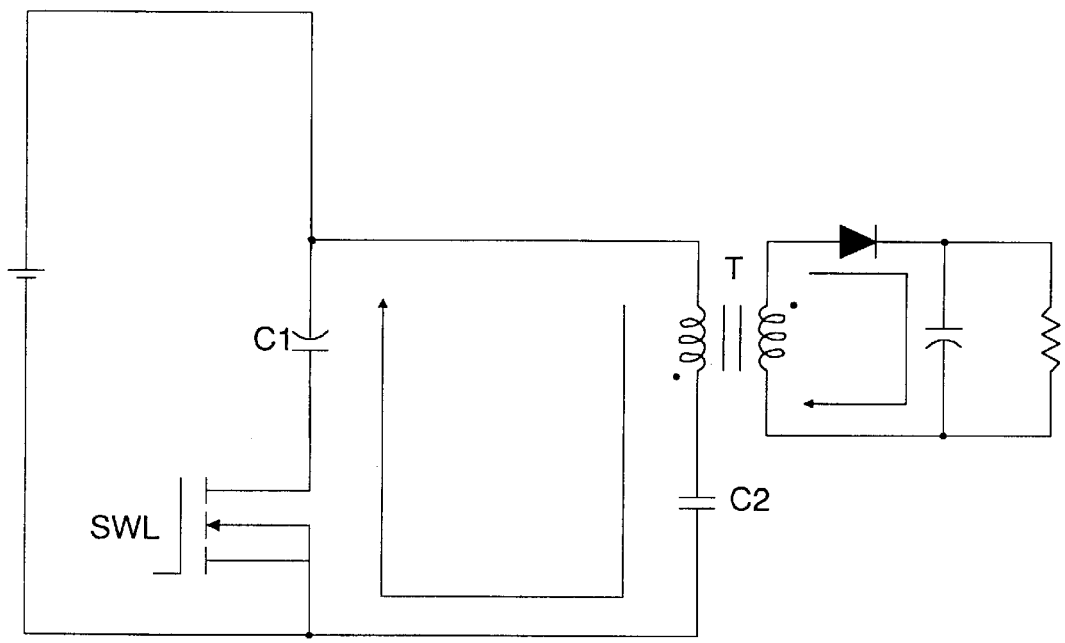

Meanwhile referring to FIG. 9, SWH is turned off while SWL is turned on in interval between t2 and t3. And the above first second capacitor C1, C2 continue to perform in charging state.

Figure 10:
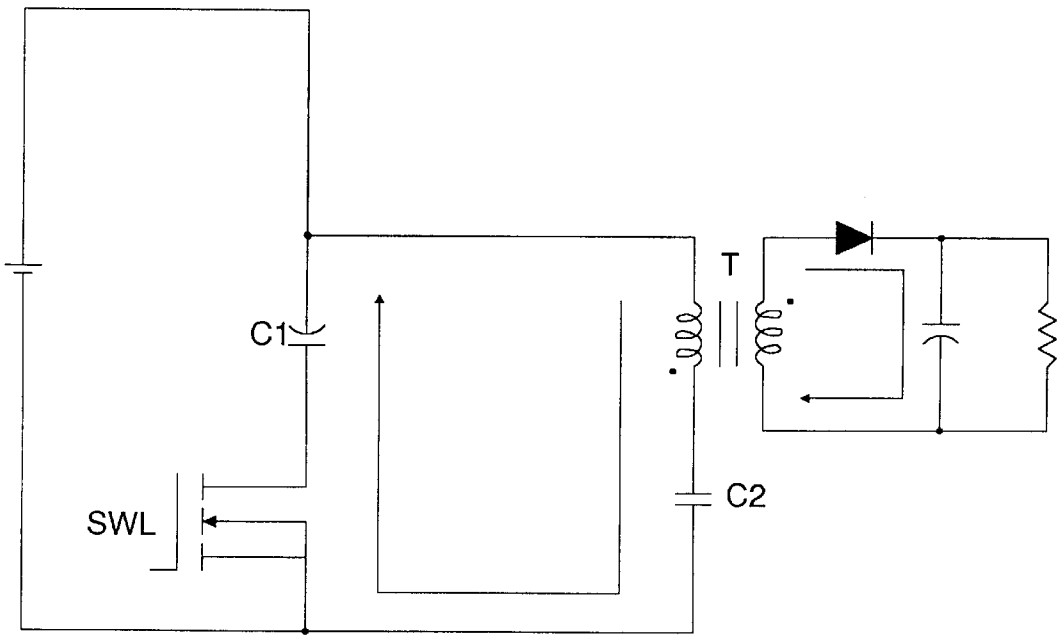

And referring to FIG. 10, SWH maintains the off state and SWL maintains the on state in interval between t3 and t4. Whence Ic becomes negative state so that C1 and C2 perform discharge.

Figure 11:
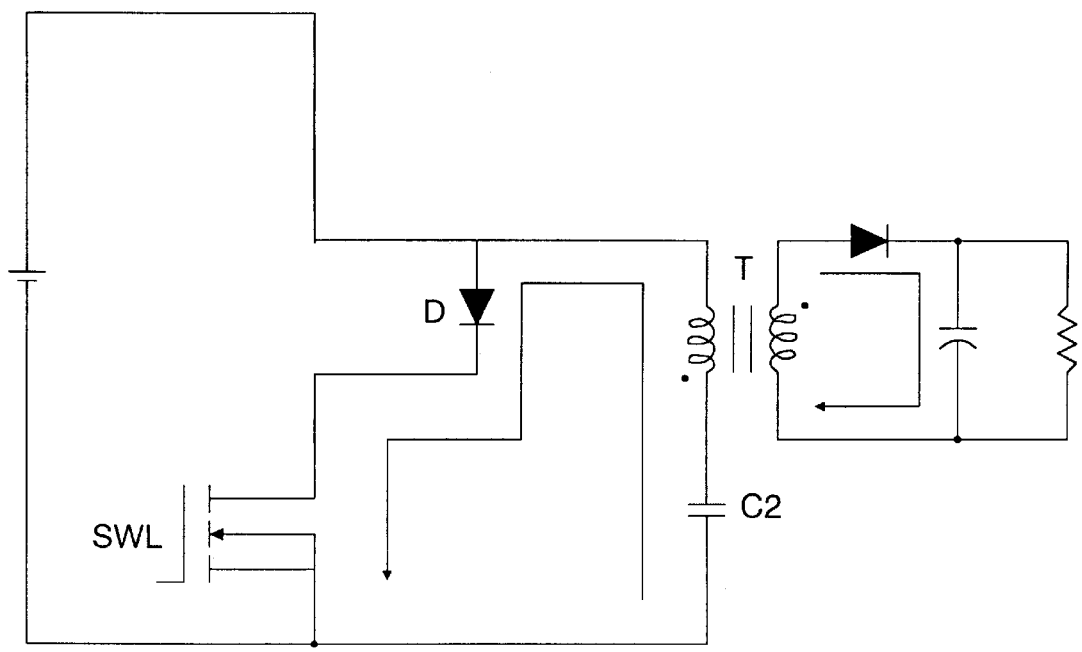

And referring to FIG. 11, SWH maintains the off state and SWL maintains the on state in interval between t4 and t5. Whence Ic maintains negative state and C2 continues to perform discharge while diode D is turned on.

Figure 12:
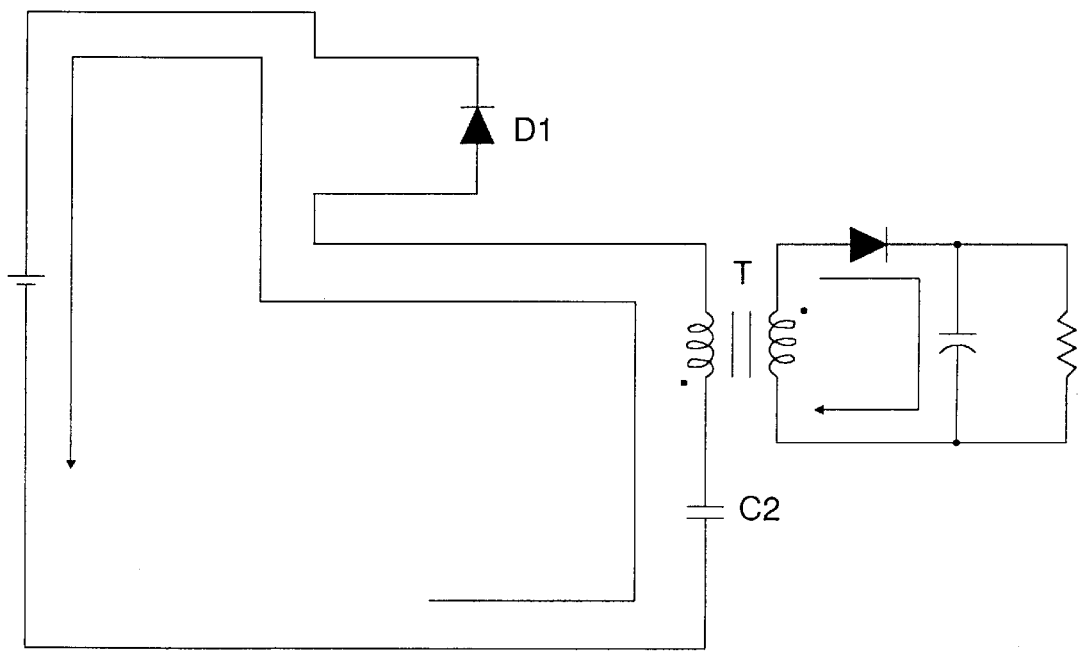

And referring to FIG. 12, SWH maintains the off state and SWL becomes the off state in interval between t5 and t6. Whence parasitic diode of SWH is turned on and C2 continues to perform discharge while Is becomes negative state.

Figure 13:
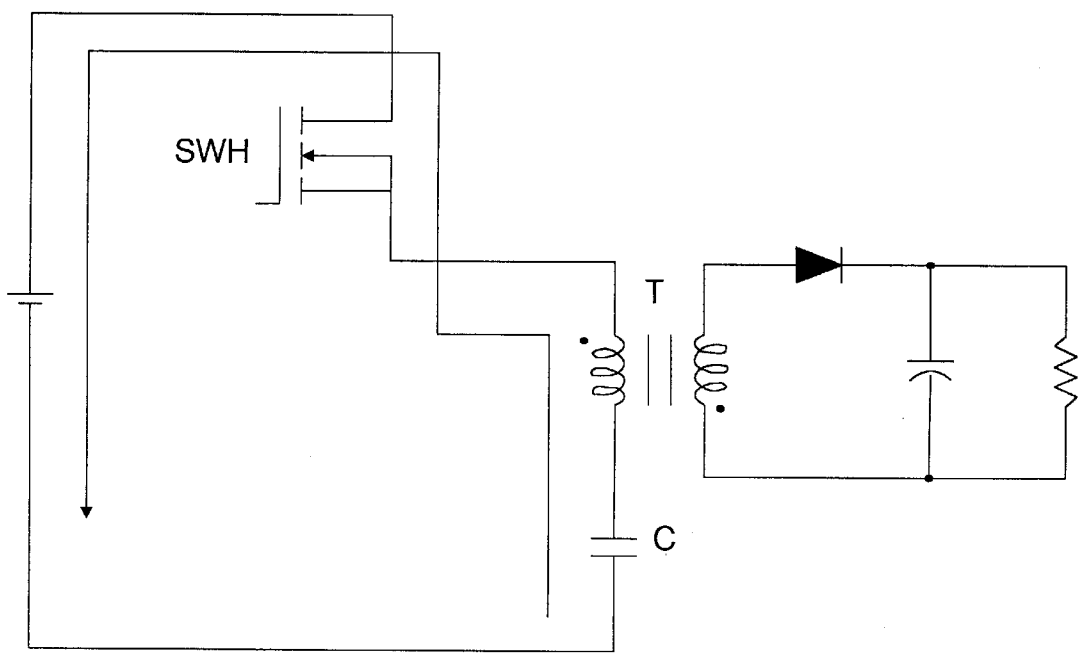

And referring to FIG. 13, SWH becomes the on state and SWL maintains the off state in interval between t6 and t7. Whence C2 continues to perform discharge while Is maintains negative state.

Eventually there occur turn-on intervals of parasitic diodes of SWH and SWL (interval between t1 and t3 and interval between t5 and t7) so that high efficiency may be made by ZVS.

And operation reliability is secured by reduction of drain-source voltage of SWH and SWL.

Though this invention has been hereabove illustrated by drawing and explained relatedly to particular practice example(s), it will be easily understood by anyone having common knowledge in this industry field that diverse modification, modulation and variation will be feasible within limit not escaping from area and concept of invention appearing at my patent claim scope that is appended hereafter.

Because high efficiency converter for ZVS of this invention as explained above can act in ZVS for wide range of whole input voltage, there becomes no need of input voltage doubler circuit so that circuitry is made simple and also there becomes other effect to be able to cut down product cost accordingly.

And there becomes effect to enhance product operation reliability because drain-source voltage of switch (MOSFET) may be reduced and adapter efficiency may be lifted.

What is claimed is:

1. A high efficiency converter for ZVS{zero voltage switching} comprising:

high side switch (SWH) and low side switch (SWL) making a closed circuit with input voltage and each making a switching action that is opposite to each other according to output signal of external driver;

first capacitor connected in series between said SWH and SWL;

a transformer that induces primary side voltage to secondary side according to switching action of said SWH and SWL;

a rectifier that rectifies output voltage of secondary side of said transformer;

a diode connected to said first capacitor in parallel; and second capacitor connected to primary coil of said transformer in series.

2. The converter in claim 1, wherein each of said SWH and SWL comprises MOSFET{metal-oxide semiconductor field-effect transistor} that has respective feedback diode inside of it.

* * * * *